United States Patent
Bonanno et al.

(10) Patent No.: US 9,471,314 B1
(45) Date of Patent: Oct. 18, 2016

(54) AUXILIARY PERCEPTRON BRANCH PREDICTOR WITH MAGNITUDE USAGE LIMIT

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Adam B. Collura, Hopewell Junction, NY (US); Daniel Lipetz, Linden, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/969,535

(22) Filed: Dec. 15, 2015

(51) Int. Cl.
  *G06F 9/00* (2006.01)
  *G06F 9/52* (2006.01)
  *G06F 9/30* (2006.01)
  *G06F 9/38* (2006.01)

(52) U.S. Cl.
  CPC ......... *G06F 9/30058* (2013.01); *G06F 9/3001* (2013.01); *G06F 9/30181* (2013.01); *G06F 9/3806* (2013.01); *G06F 9/3844* (2013.01); *G06F 9/3848* (2013.01)

(58) Field of Classification Search
  CPC .. G06F 9/3844; G06F 9/3806; G06F 9/3848; G06F 9/38868; G06F 9/3001; G06F 9/30181
  See application file for complete search history.

(56) References Cited

U.S. PATENT DOCUMENTS

| | | | | |
|---|---|---|---|---|
| 6,092,187 | A * | 7/2000 | Killian | G06F 9/3848 712/239 |
| 7,191,329 | B2 | 3/2007 | Murphy | |
| 7,644,258 | B2 * | 1/2010 | Glew | G06F 9/3848 712/239 |
| 2003/0065912 | A1 * | 4/2003 | Hum | G06F 9/3848 712/239 |
| 2004/0225872 | A1 * | 11/2004 | Bonanno | G06F 9/3848 712/239 |
| 2005/0066154 | A1 * | 3/2005 | Chung | G06F 9/3848 712/239 |
| 2009/0063819 | A1 | 3/2009 | Doing et al. | |
| 2012/0166775 | A1 * | 6/2012 | Krishnamurthy | G06F 9/3848 712/239 |
| 2013/0332712 | A1 | 12/2013 | Bonanno et al. | |

OTHER PUBLICATIONS

Gao, H. et al., "Address-branch correlation: a novel locality for long-latency hard-to-predict branches," 2008 IEEE 14 International Symposium on High Performance Computer Architecture, pp. 74-85, IEEE, Feb. 2008.
List of IBM Patents or Patent Applications Treated as Related, dated Feb. 24, 2016, 2 pages.

(Continued)

*Primary Examiner* — Daniel Pan
(74) *Attorney, Agent, or Firm* — Cantor Colburn LLP; Margaret McNamara

(57) ABSTRACT

According to an aspect, branch prediction in a processing system that includes a primary branch predictor and an auxiliary perceptron branch predictor is provided. The primary branch predictor and the auxiliary perceptron branch predictor are searched to make a branch prediction. A perceptron magnitude of a perceptron branch predictor from the auxiliary perceptron branch predictor is compared to a magnitude usage limit. An auxiliary predictor result from the auxiliary perceptron branch predictor is selected as the branch prediction based on the perceptron magnitude exceeding the magnitude usage limit. A primary predictor result from the primary branch predictor is selected as the branch prediction based on the perceptron magnitude not exceeding the magnitude usage limit.

18 Claims, 9 Drawing Sheets

(56) References Cited

OTHER PUBLICATIONS

U.S. Appl. No. 14/969,391, filed Dec. 15, 2015, Entitled: Perceptron Branch Predictor With Virtualized Weights, First Named Inventor: James J. Bonanno.

U.S. Appl. No. 14/969,492, filed Dec. 15, 2015, Entitled: Auxiliary Branch Prediction With Usefulness Tracking, First Named Inventor: James J. Bonanno.

Xiang, P. et al., "Revisiting ILP Designs for Throughput-oriented GPGPU Architecture," 2015 15th IEEE/ACM International Symposium on Cluster, Cloud and Grid Computing (CCGrid) Proceedings, pp. 121-130, IEEE Computer Society, May 2015.

List of IBM Patents or Patent Applications Treated as Related, dated Jul. 19, 2016, 2 pages.

U.S. Appl. No. 15/194,898, filed Jun. 28, 2016, Entitled: Perceptron Branch Predictor With Virtualized Weights, First Named Inventor: James J. Bonanno.

* cited by examiner

AUXILIARY PERCEPTRON BRANCH PREDICTOR WITH MAGNITUDE USAGE LIMIT

BACKGROUND

The present invention relates generally to computer processing systems, and more particularly to an auxiliary perceptron branch predictor with a magnitude usage limit in a processing system.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register. A throughput penalty is incurred if a branch is mispredicted.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

According to one embodiment, a method is provided for branch prediction in a processing system that includes a primary branch predictor and an auxiliary perceptron branch predictor. The primary branch predictor and the auxiliary perceptron branch predictor are searched to make a branch prediction. A perceptron magnitude of a perceptron branch predictor from the auxiliary perceptron branch predictor is compared to a magnitude usage limit. An auxiliary predictor result from the auxiliary perceptron branch predictor is selected as the branch prediction based on the perceptron magnitude exceeding the magnitude usage limit. A primary predictor result from the primary branch predictor is selected as the branch prediction based on the perceptron magnitude not exceeding the magnitude usage limit.

According to another embodiment, a processing system includes a primary branch predictor, a primary search and hit controller, an auxiliary perceptron branch predictor, an auxiliary search and hit controller, and a predictor selector. The primary search and hit controller is operable to search the primary branch predictor and generate a primary predictor result. The auxiliary search and hit controller is operable to search the auxiliary perceptron branch predictor and generate an auxiliary predictor result. The predictor selector is operable to select the auxiliary predictor result as a branch prediction based on a perceptron magnitude from the auxiliary perceptron branch predictor exceeding a magnitude usage limit. The predictor selector is further operable to select the primary predictor result as the branch prediction based on the perceptron magnitude from the auxiliary perceptron branch predictor not exceeding the magnitude usage limit.

According to a further embodiment, a computer program product is provided. The computer program product includes a computer readable storage medium having program instructions embodied therewith. The program instructions are executable by a processor including a primary branch predictor and an auxiliary perceptron branch predictor to cause the processor to search the primary branch predictor and the auxiliary perceptron branch predictor to make a branch prediction. A perceptron magnitude of a perceptron branch predictor from the auxiliary perceptron branch predictor is compared to a magnitude usage limit. An auxiliary predictor result from the auxiliary perceptron branch predictor is selected as the branch prediction based on the perceptron magnitude exceeding the magnitude usage limit. A primary predictor result from the primary branch predictor is selected as the branch prediction based on the perceptron magnitude not exceeding the magnitude usage limit.

DETAILED DESCRIPTION

Embodiments provide auxiliary perceptron branch prediction with a magnitude usage limit. An auxiliary perceptron branch predictor can be implemented as a relatively small table (i.e., in terms of number of entries) of highly accurate perceptron branch predictors. Installation of entries into the auxiliary perceptron branch predictor can be managed to track which branches optimize performance based on usefulness tracking. In many workloads, a small subset of branch instruction addresses account for a large percentage of mispredicted branch outcomes. Embodiments dynamically identify branches which are frequently mispredicted by primary branch predictors and correctly predicted by the auxiliary perceptron branch predictor, keeping these branches in the auxiliary perceptron branch predictor. The remaining branches can be effectively predicted with other smaller primary branch predictor entries.

In embodiments, the auxiliary perceptron branch predictor uses perceptron branch prediction, which is an artificial neural network that predicts a branch's direction by learning correlations between bits in a history vector and the branch outcome. The auxiliary perceptron branch predictor can store signed integer weights for each bit in the history vector. A perceptron branch predictor is highly accurate upon training; however, the amount of training required to reach a high level of accuracy can vary depending on patterns and changes in the workloads. Embodiments include a magnitude usage limit (L) to assist in selecting between results of primary branch predictors and the auxiliary perceptron branch predictor. The perceptron branch predictor is not used when its prediction magnitude is less than the limit L. In such a case, an alternative primary prediction from the primary branch predictors is used. A limit learning process can dynamically adjust the limit L by learning at what value the limit L is more beneficial than detrimental for the perceptron branch predictor and what limit L−1 is more detrimental than beneficial for the perceptron branch predictor.

Figure 1:
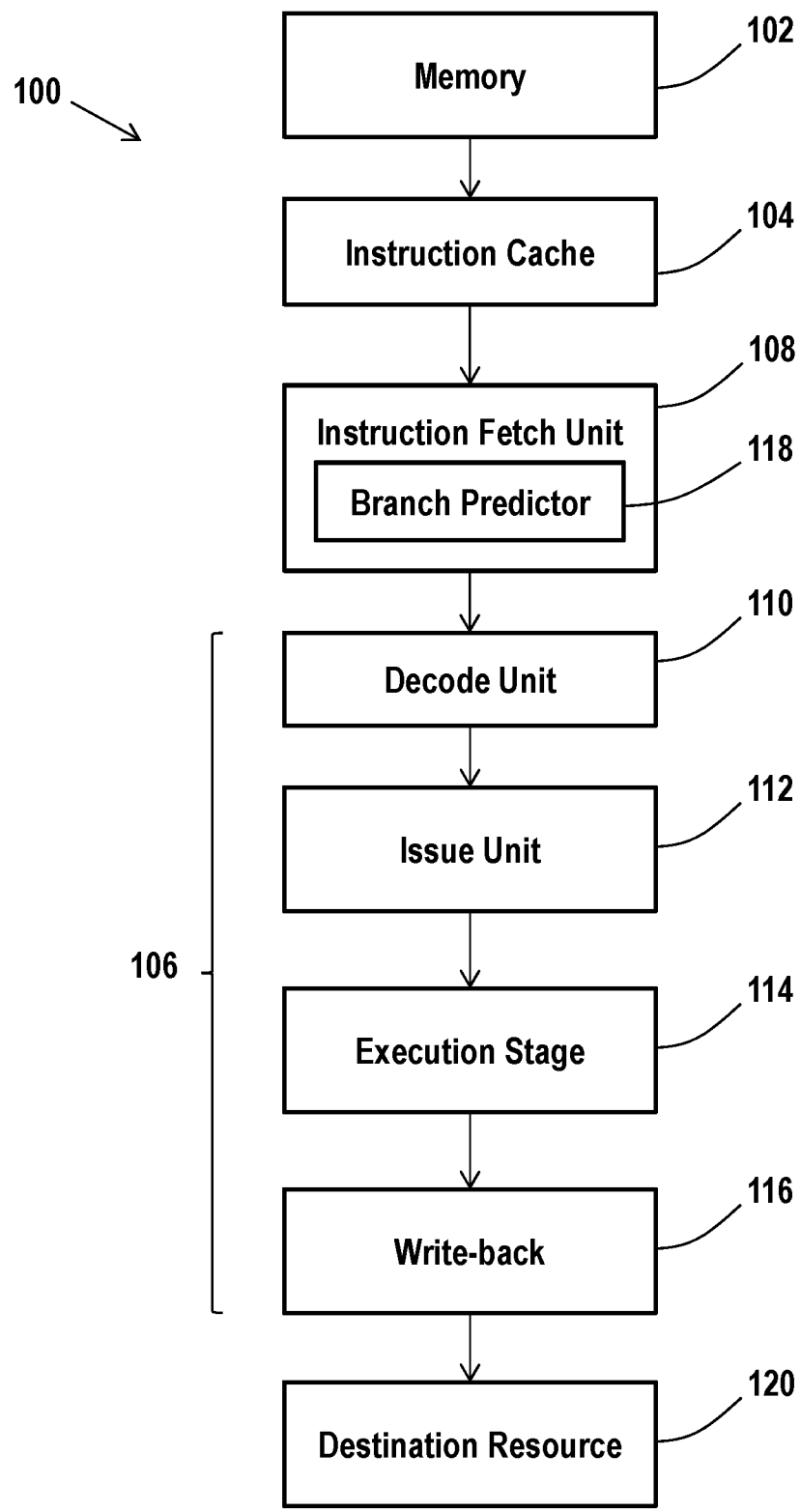
FIG. 1 illustrates a block diagram of a processing system in accordance with an embodiment.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or nonvolatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes the branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement auxiliary perceptron branch prediction with a magnitude usage limit.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
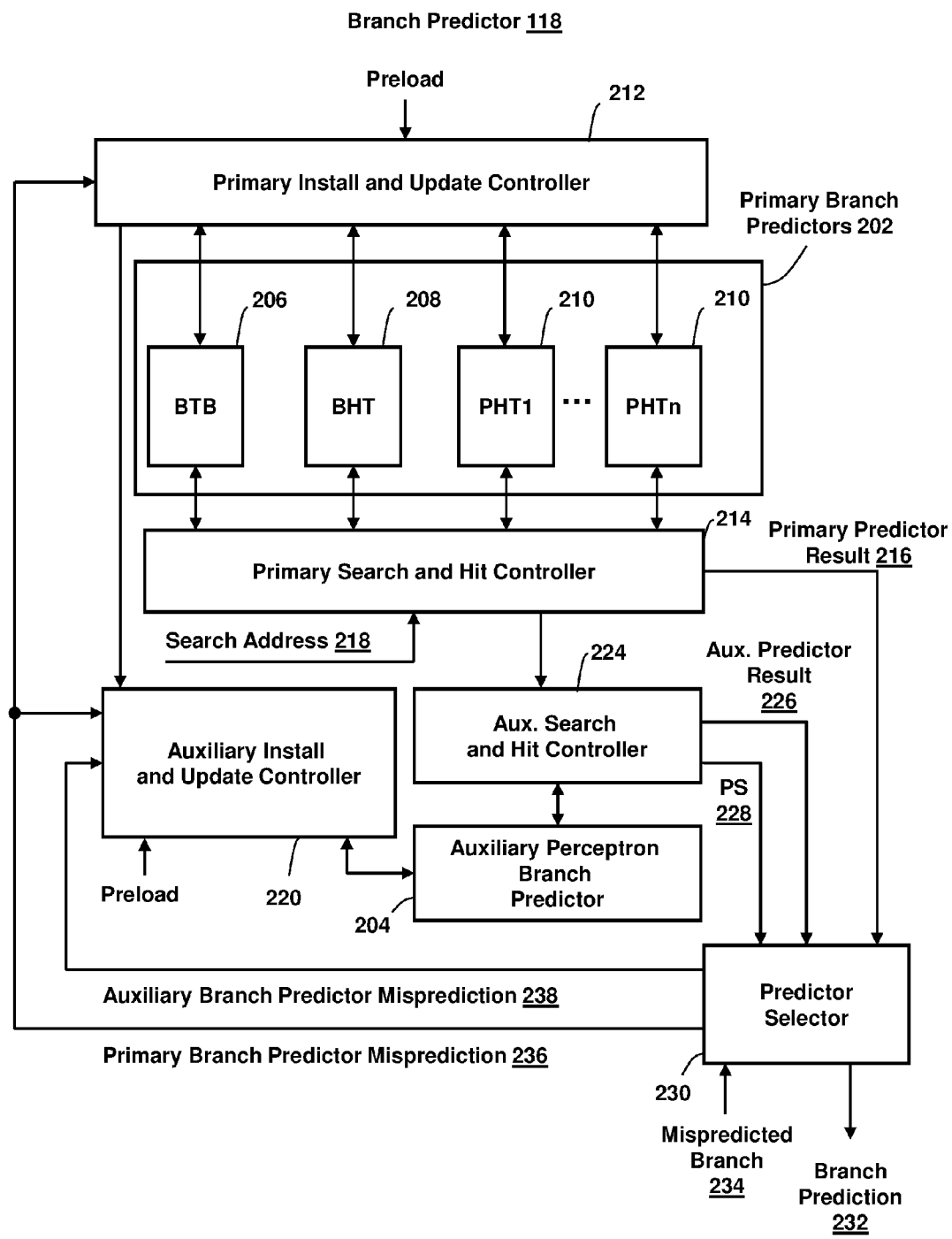
FIG. 2 depicts a branch predictor in accordance with an embodiment.

FIG. 2 depicts an example of the branch predictor 118 of FIG. 1 in greater detail. The example branch predictor 118 of FIG. 2 includes one or more primary branch predictors 202 and an auxiliary perceptron branch predictor 204. The primary branch predictors 202 can include any combination of primary branch prediction structures, such as a branch target buffer (BTB) 206, a branch history table (BHT) 208, and one or more pattern history tables (PHT) 210. The BTB 206 may be set associative and include multiple sets (columns) of BTB entries with each BTB entry including a branch address tag and a predicted target address, for example. The BHT 208 holds branch history information that indicates whether a branch is predicted as taken or not taken. The BHT 208 can also include prediction strength indicators for BHT direction predictions (e.g., strong not taken, weak not taken, weak taken, and strong taken). The BHT 204 may be indexed based on an instruction address. Each of the PHTs 210 can hold prediction strength indicators for PHT direction predictions and tags associated with branch prediction patterns. A depth (number of entries) of each PHT 210 may be adjusted based on observed recurring branch patterns or sequences observed in instructions processed by the processing system 100 of FIG. 1. Each PHT 210 may be accessed based on an index that is separately managed and adjusted. Indexing of each PHT 210 can be based on path history and a function of an instruction address, a global history vector, and/or a global taken path history vector.

The branch predictor 118 of FIG. 2 also includes a primary install and update controller 212 that controls installing and updating entries in the primary branch predictors 202. Although a single instance of the primary install and update controller 212 is depicted for the primary branch predictors 202, it will be understood that the primary install and update controller 212 can be subdivided to support one or more specific branch predictor types, i.e., to separately manage the BTB 206, BHT 208, and one or more PHT 210. The branch predictor 118 further includes a primary search and hit controller 214 that can search the primary branch prediction structures of the primary branch predictors 202 in parallel to determine a primary predictor result 216, for instance, based on a search address 218 and/or corresponding indexing scheme. The primary predictor result 216 can include a branch target address and a taken/not taken prediction.

Similarly, the branch predictor 118 can include an auxiliary install and update controller 220 operable to install and update entries in the auxiliary perceptron branch predictor 204. An auxiliary search and hit controller 224 can search the auxiliary perceptron branch predictor 204 to determine an auxiliary predictor result 226, for instance, based on the search address 218 and/or corresponding indexing scheme provided through the primary search and hit controller 214. The auxiliary predictor result 226 can include a branch target address and a taken/not taken prediction. The primary branch predictors 202 and the auxiliary perceptron branch predictor 204 can be searched in parallel, resulting in predictions that may differ from each other as the primary predictor result 216 and the auxiliary predictor result 226. The auxiliary perceptron branch predictor 204 can provide a predictor selection 228 indicating whether a predictor selector 230 should use the primary predictor result 216 or the auxiliary predictor result 226 as a branch prediction 232 of the branch predictor 118. Upon the auxiliary search and hit controller 224 locating a hit in the auxiliary perceptron branch predictor 204, the predictor selection 228 is provided that corresponds to the auxiliary predictor result 226.

The branch prediction 232 can be used by the instruction fetch unit 108 of FIG. 1 to prefetch instructions. If it is later determined in the processing pipeline 106 of FIG. 1 that the branch prediction 232 was mispredicted and/or not previously predictable (e.g., a surprise branch), the branch predictor 118 receives an indicator of a mispredicted branch 234. The predictor selector 230 or other logic of the branch predictor 118 can determine whether the mispredicted branch 234 was predicted by the primary branch predictors 202 or the auxiliary perceptron branch predictor 204. A primary branch predictor misprediction indicator 236 can be provided to both the primary install and update controller 212 and the auxiliary install and update controller 220. The primary branch predictor misprediction indicator 236 can be used by the primary install and update controller 212 to update the contents of the primary branch predictors 202. An auxiliary branch predictor misprediction indicator 238 can be provided to the auxiliary install and update controller 220. Both the primary branch predictor misprediction indicator 236 and the auxiliary branch predictor misprediction indicator 238 can be used to update the contents of the auxiliary perceptron branch predictor 204 as further described herein. Further, a change to the contents of the primary branch predictors 202, such as invalidation of a BTB entry in the BTB 206 can be communicated from the primary install and update controller 212 to the auxiliary install and update controller 220, for instance to invalidate a referenced entry in the auxiliary perceptron branch predictor 204.

While the primary install and update controller 212 can use the primary branch predictor misprediction indicator 236 to trigger installs and updates to the primary branch predictors 202, the primary branch predictors 202 can be installed and/or updated based on other events, such as path history, taken/not taken indicators, and the like. The primary install and update controller 212 may also support preloading of one or more of the primary branch predictors 202, for instance, as part of restoring to a previously stored checkpoint, testing, or other purposes. Similarly, the auxiliary install and update controller 220 can use the primary branch predictor misprediction indicator 236 and the auxiliary branch predictor misprediction indicator 238 to trigger installs and updates to the auxiliary perceptron branch predictor 204, as well as other events, such as path history, taken/not taken indicators, and the like. The auxiliary install and update controller 220 may also support preloading of the auxiliary perceptron branch predictor 204, for instance, as part of restoring to a previously stored checkpoint, testing, or other purposes.

Figure 3:
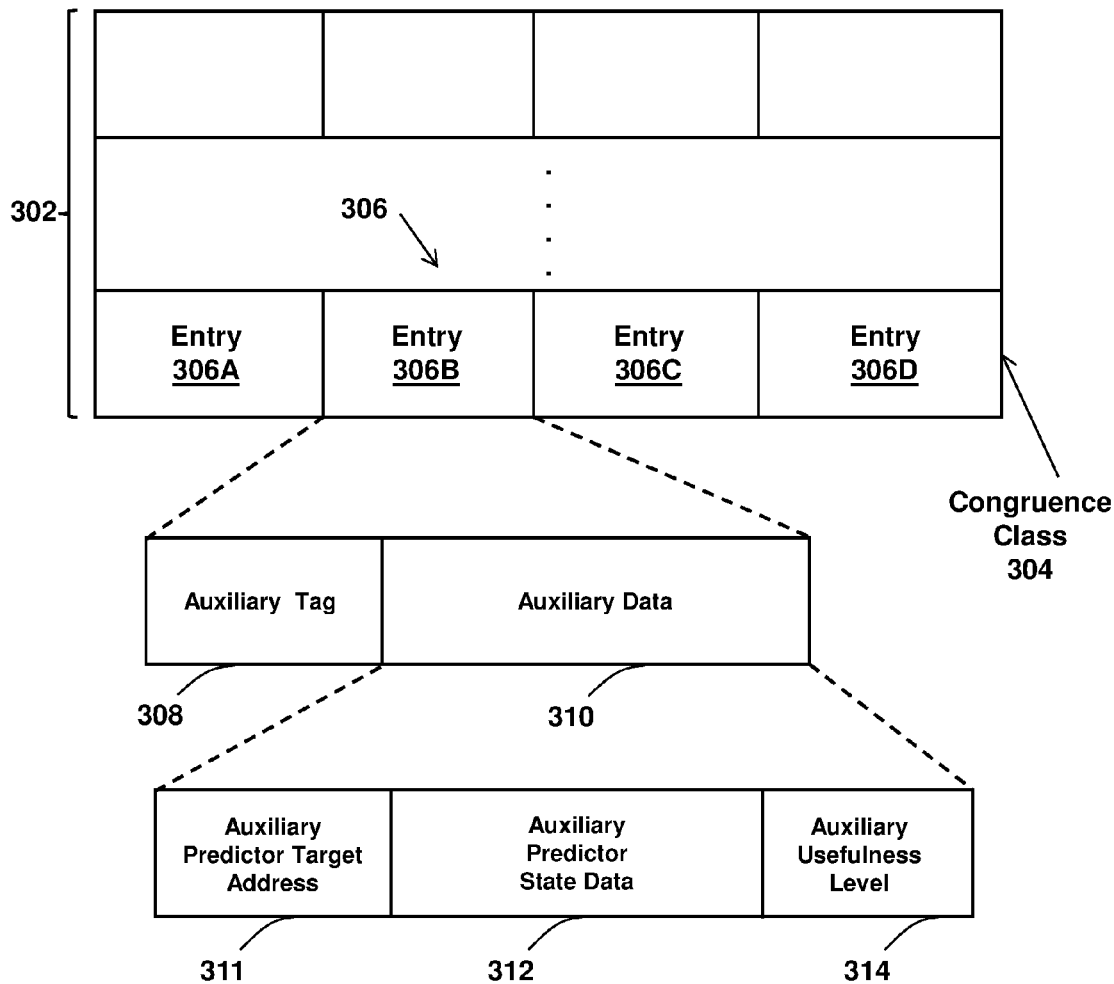
FIG. 3 depicts an auxiliary perceptron branch predictor in accordance with an embodiment.

The auxiliary perceptron branch predictor 204 can be structured as a tagged, set-associative table indexed by an instruction address (e.g., search address 218) and/or a global branch/path history (e.g., as used for indexing each PHT 210). An example structure of auxiliary perceptron branch predictor 204 is depicted in greater detail in FIG. 3. The auxiliary perceptron branch predictor 204 can include a plurality of congruence classes 302. The auxiliary install and update controller 220 and/or the auxiliary search and hit controller 224 can index to locate a particular congruence class 304 of the congruence classes 302, i.e., based on matching a subset of search address bits with an indexed position of the congruence class 304. Each of the congruence classes 302, including the congruence class 304, has a plurality of entries 306A-D. In the example of FIG. 3, congruence class 304 includes entry 306A, 306B, 306C, and 306D. Each entry 306 can include an auxiliary tag 308 and auxiliary data 310. The auxiliary tag 308 includes a portion of bits to map to a specific indexed/addressed position in combination with the position of the congruence class 304.

As one example, an address of an instruction fetched by the instruction fetch unit 108 of FIG. 1 is used as an initial value of search address 218 of FIG. 2 to access the branch predictor 118 and predict a branch target address. When looking for auxiliary branch predictions, the auxiliary perceptron branch predictor 204 is read and can provide an auxiliary predictor result 226 if the auxiliary perceptron branch predictor 204 contains an entry 306 with an auxiliary tag 308 matching a portion of the search address 218. The auxiliary predictor result 226 can include an auxiliary predictor target address 311 and a prediction direction 414 (FIG. 4) determined by a perceptron branch predictor using data stored in auxiliary predictor state data 312 and/or other sources. The auxiliary perceptron branch predictor 204 provides input to the auxiliary search and hit controller 224 to determine whether a match or "hit" is located. If a match is found, the auxiliary search and hit controller 224 outputs auxiliary predictor result 226 along with an associated value of the predictor selection 228 based on the same entry 306. The auxiliary predictor target address 311 stored in the auxiliary perceptron branch predictor 204 may only include a subset of address bits which can expanded to include additional address bits by the auxiliary search and hit controller 224 and/or the predictor selector 230.

Each auxiliary predictor entry 306 can also include one or multiple highly accurate perceptron branch predictors in auxiliary predictor state data 312 to support branch prediction direction (i.e., taken vs. not-taken). A large volume of data per entry 306 may be needed to support complex prediction algorithms. As such, the auxiliary perceptron branch predictor 204 typically includes much fewer total entries as compared to the number of entries in the BTB 206, which can use a simple branch address tag and target format known in the art. In the example of FIG. 3, the auxiliary data 310 in each entry 306 may also include an auxiliary usefulness level 314 and/or other values (not depicted).

In an embodiment, the auxiliary install and update controller 220 attempts to install an entry 306 into the auxiliary perceptron branch predictor 204 when there is a misprediction by the primary branch predictors 202. Within a congruence class 304, the auxiliary install and update controller 220 determines which, if any, existing entry 306 in the congruence class 304 to replace according to a replacement policy. An attempted install may not succeed if the replacement policy determines that it is likely better for performance to protect all the existing entries 306A-D in the congruence class 304 from being replaced.

In an embodiment, the auxiliary install and update controller 220 replaces the least useful entry (i.e., having a lowest auxiliary usefulness level 314 in entries 306A-D of congruence class 304) and/or may also consider other factors. Upon installing an entry 306, the auxiliary usefulness level 314 can be set to a low initial value (for example to 1). The auxiliary usefulness level 314 of the entry 306 can be increased whenever primary branch predictors 202 were wrong (e.g., primary branch predictor misprediction indicator 236 is set), and either the prediction from the auxiliary perceptron branch predictor 204 was correct (e.g., auxiliary branch predictor misprediction indicator 238 is clear) or the entry 306 of the auxiliary perceptron branch predictor 204 has not been trained enough (e.g., auxiliary usefulness level 314 is below a training threshold). The auxiliary usefulness level 314 may be periodically reduced to prevent saturation at a maximum value.

In addition to the auxiliary usefulness level 314 affecting the replacement policy, the auxiliary usefulness level 314 can also affect whether or not the prediction from the auxiliary perceptron branch predictor 204 is used. For example, with a 5-bit auxiliary usefulness level 314, if the value is between 0 and 7, the auxiliary predictor result 226 may not be used, but the perceptron predictor associated with auxiliary state data 312 can be trained. If the value of the auxiliary usefulness level 314 is between 8 and 31, the auxiliary predictor result 226 may be selected for use by the predictor selector 230 as the branch prediction 232 rather than selecting the primary predictor result 216.

The update policy for the auxiliary perceptron branch predictor 204 may be to update the entry 306 whenever a match occurred with the auxiliary perceptron branch predictor 204 even if the auxiliary data 310 was not used to make the prediction due to a low value in the auxiliary usefulness level 314. For a perceptron branch predictor, an update can be done if the perceptron's prediction did not match the branch outcome, or the perceptron prediction did match the branch outcome but the magnitude of the prediction (i.e., prediction strength) was below a confidence threshold.

Figure 4:
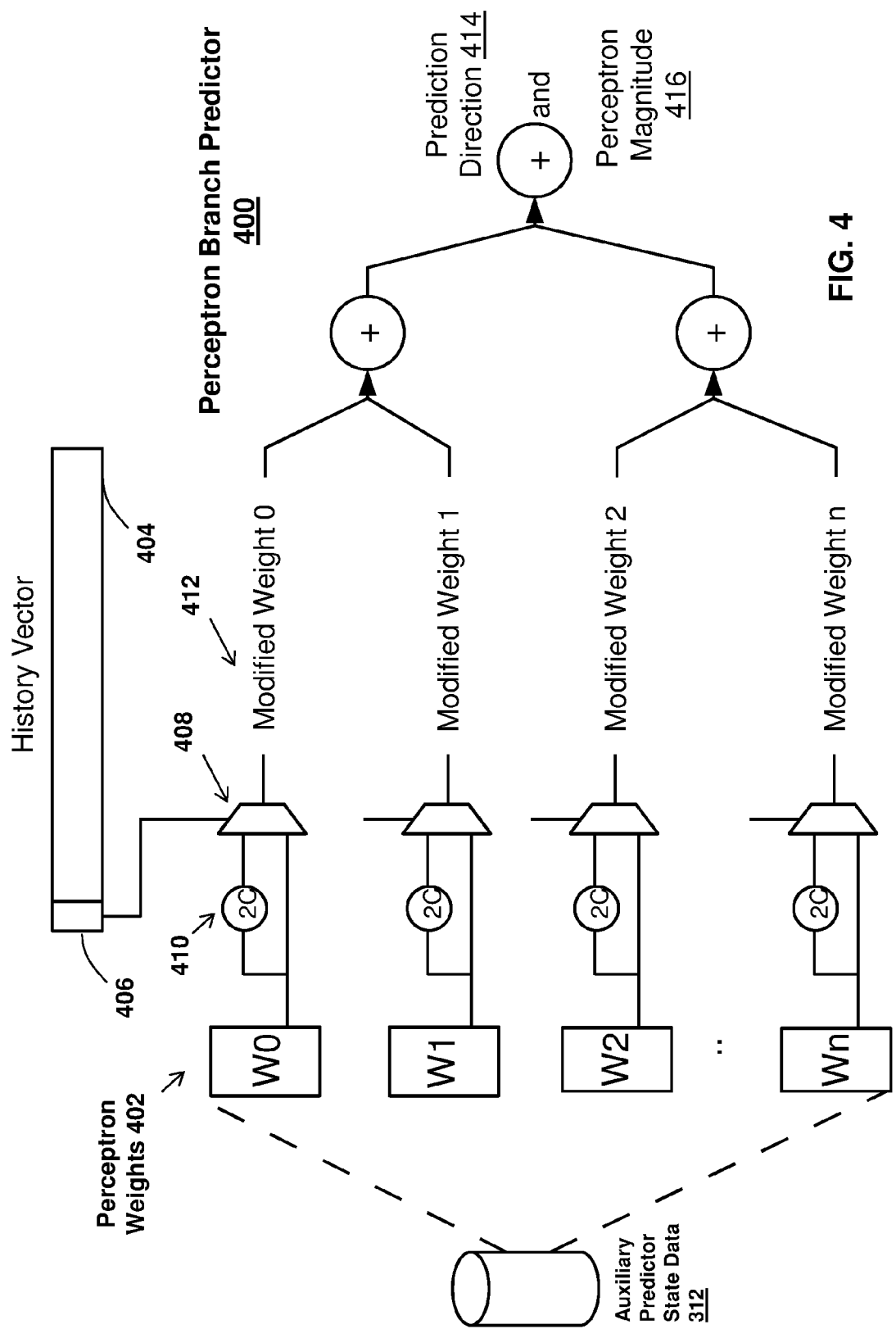
FIG. 4 depicts a block diagram of a perceptron branch predictor in accordance with an embodiment.

FIG. 4 depicts a block diagram of a perceptron branch predictor 400 in accordance with an embodiment. The auxiliary predictor state data 312 for a selected entry 306 of FIG. 3 includes a plurality of perceptron weights 402, depicted in FIG. 4 as W0, W1, W2, . . . , Wn. The perceptron weights 402 can be implemented as signed integers that are updated according to known perceptron algorithms. In the example of FIG. 4, the number of perceptron weights 402 is equivalent to the size of a history vector 404 (e.g., number of bits). The history vector 404 can be shared globally across a plurality of perceptron branch predictors to track a sequence of branch direction predictions. Alternatively, there can be multiple instances of the history vector 404. Each bit 406 of the history vector 404 is coupled to a multiplexer 408. Each multiplexer 408 receives one of the perceptron weights 402 and a corresponding twos-complement 410 (i.e., negative version) of the same perceptron weight 402, such as W0 and -W0. Modified weights 412 are computed based on the perceptron weights 402 and values of the history vector 404. For example, if bit 406 in FIG. 4 is a zero, then modified weight0 would be set to -W0; however, if bit 406 is a one, then modified weight0 would be set to W0. This computation can be performed in parallel for all modified weights0-n. The modified weights 412 are summed to produce a result, the sign of which is the prediction direction 414 and the absolute value of which is the perceptron magnitude 416. The perceptron magnitude 416 is used as a confidence level. A positive sign in the prediction direction 414 may be considered predicted taken in the auxiliary predictor result 226. A negative sign may be considered predicted not-taken in the auxiliary predictor result 226.

Figure 5:
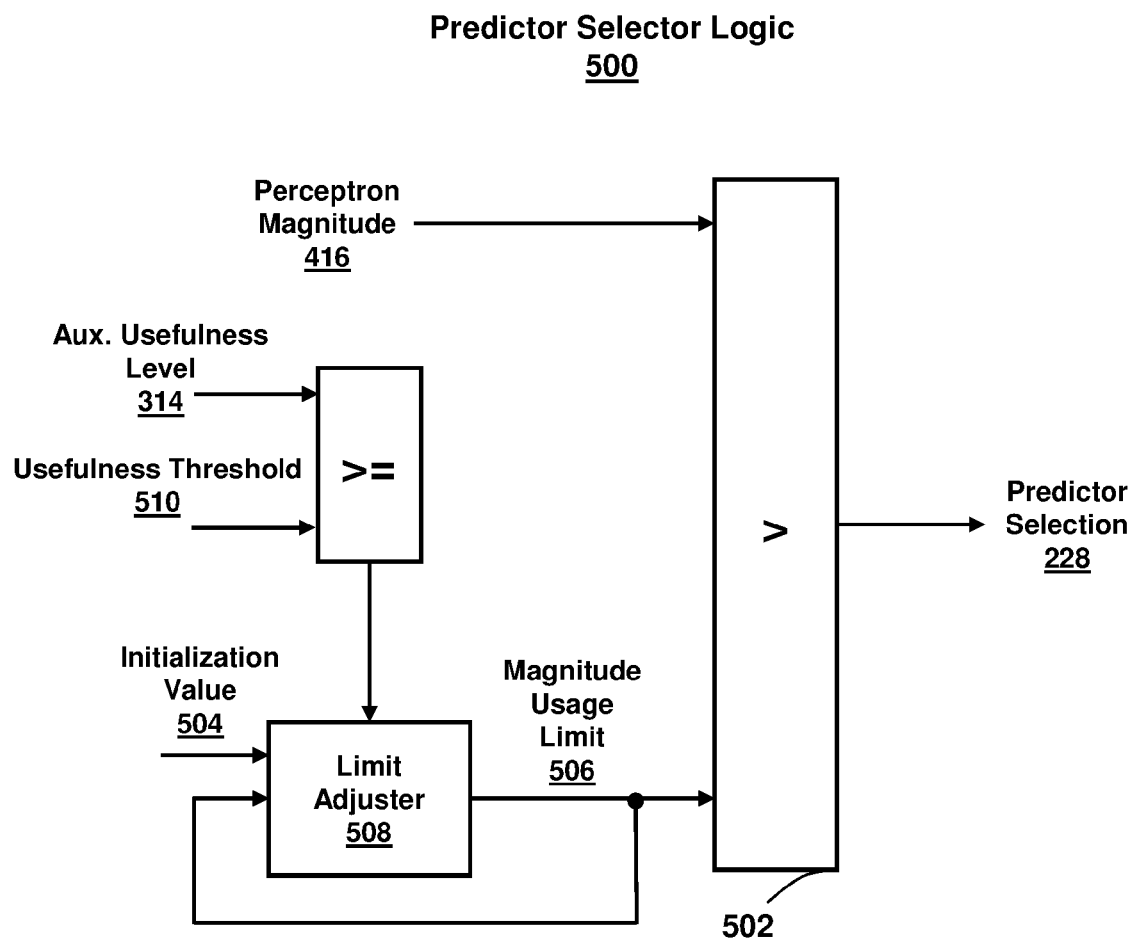
FIG. 5 depicts a block diagram of predictor selector logic in accordance with an embodiment.

FIG. 5 depicts a block diagram of predictor selector logic 500 in accordance with an embodiment. The predictor selector logic 500 includes a comparator 502 to determine whether the perceptron magnitude 416 of a perceptron branch predictor 400 from the auxiliary perceptron branch predictor 204 is greater than a magnitude usage limit 506. It will be understood that the comparator 502 can be modified to support other comparison configurations, such as greater-than-equal-to, less-than, and less-than-equal-to. Predictor selection 228 can be output from comparator 502. For instance, the predictor selection 228 can have a value of one when perceptron magnitude 416 is greater than magnitude usage limit 506, indicating that the predictor selector 230 of FIG. 2 should select the auxiliary predictor result 226 rather than the primary predictor result 216 as the branch prediction 232.

The value of the magnitude usage limit 506 may be dynamically adjusted by a limit adjuster 508 from an initialization value 504. Adjustments to the magnitude usage limit 506 may be conditioned on determining an outcome of a branch found in an entry 306 of the auxiliary perceptron branch predictor 204 and determining that the auxiliary usefulness level 314 of the entry 306 is at or above a global usefulness threshold 510.

Perceptron accuracy typically increases with perceptron magnitude 416. A perceptron predictor's direction prediction can match the primary predictor's prediction. In this case it is considered neutral. A perceptron predictor's direction prediction can differ from the primary predictor's direction prediction. In this case if the perceptron is correct, it can be considered beneficial; if the perceptron is incorrect it can be considered detrimental. It is preferred to use the perceptron when the perceptron prediction will be beneficial and to use the primary prediction when the perceptron prediction will be detrimental. The global usefulness threshold 510 establishes a learning period during which the primary predictor result 216 can be selected and adjustments to the magnitude usage limit 506 may be disabled. Upon the auxiliary usefulness level 314 reaching the global usefulness threshold 510, the limit adjuster 508 can modify the magnitude usage limit 506 and the predictor selection 228 can select either the auxiliary predictor result 226 or the primary predictor result 216 depending on the results of the comparator 502. In one embodiment, the global usefulness threshold 510 is set to about 25% of the full range of the auxiliary usefulness level 314.

Figure 6:
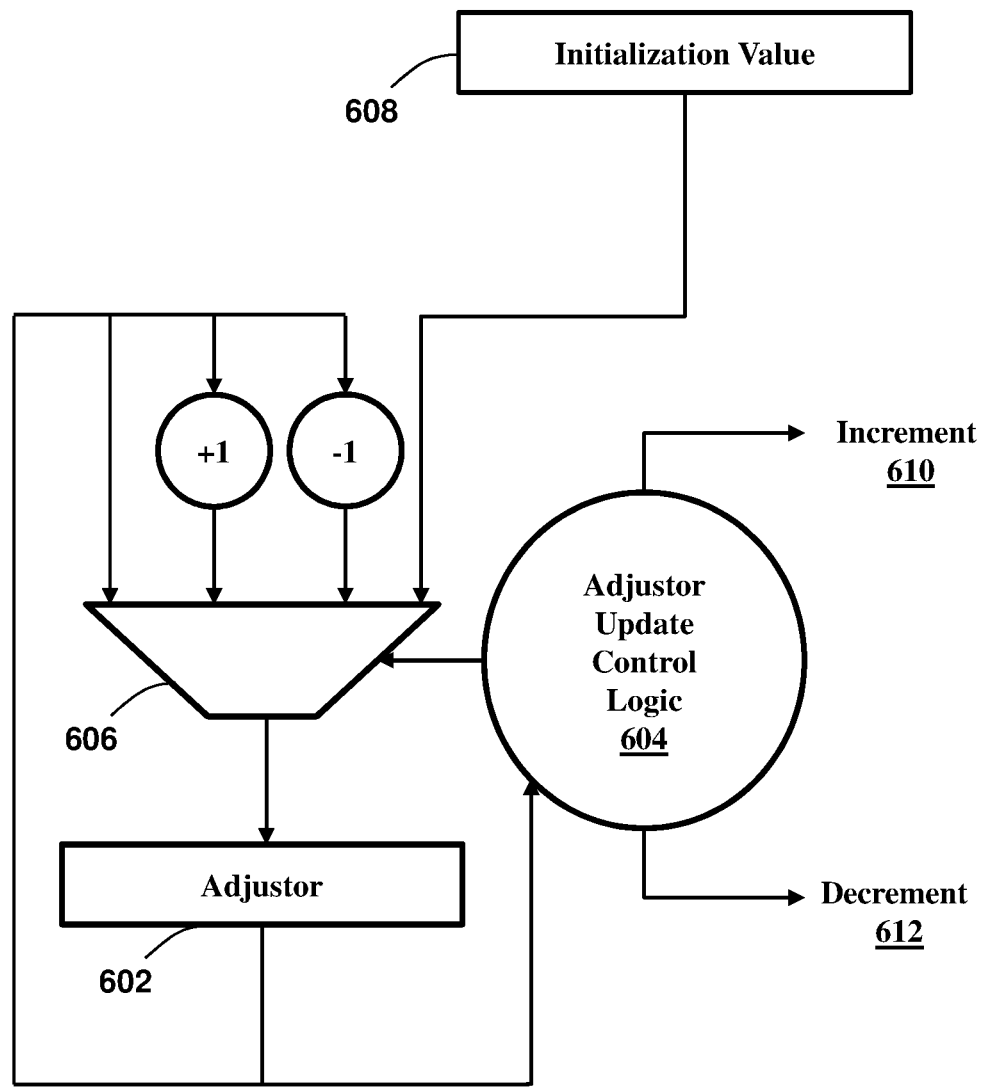
FIG. 6 depicts a block diagram for updating an adjustor in accordance with an embodiment.

FIG. 6 depicts a block diagram for updating an adjustor in accordance with an embodiment that can be used within the limit adjuster 508 of FIG. 5. Multiple adjustors can be implemented to track and adjust the magnitude usage limit 506 of FIG. 5. The value to be adjusted, adjustor 602, can be a register that is balanced between a minimum and a maximum value by adjustor update control logic 604. The adjustor update control logic 604 controls input selection for a multiplexer 606 to maintain the adjustor 602 at its current value, to increase the adjustor 602 by one, to decrease the adjustor 602 by one, or to set the adjustor 602 to an initialization value 608. The adjustor update control logic 604 can command an increment 610 or a decrement 612 of the magnitude usage limit 506 of FIG. 5. Multiple instances of the structure of FIG. 6 are combined and described in greater detail with respect to FIG. 7.

Figure 7:
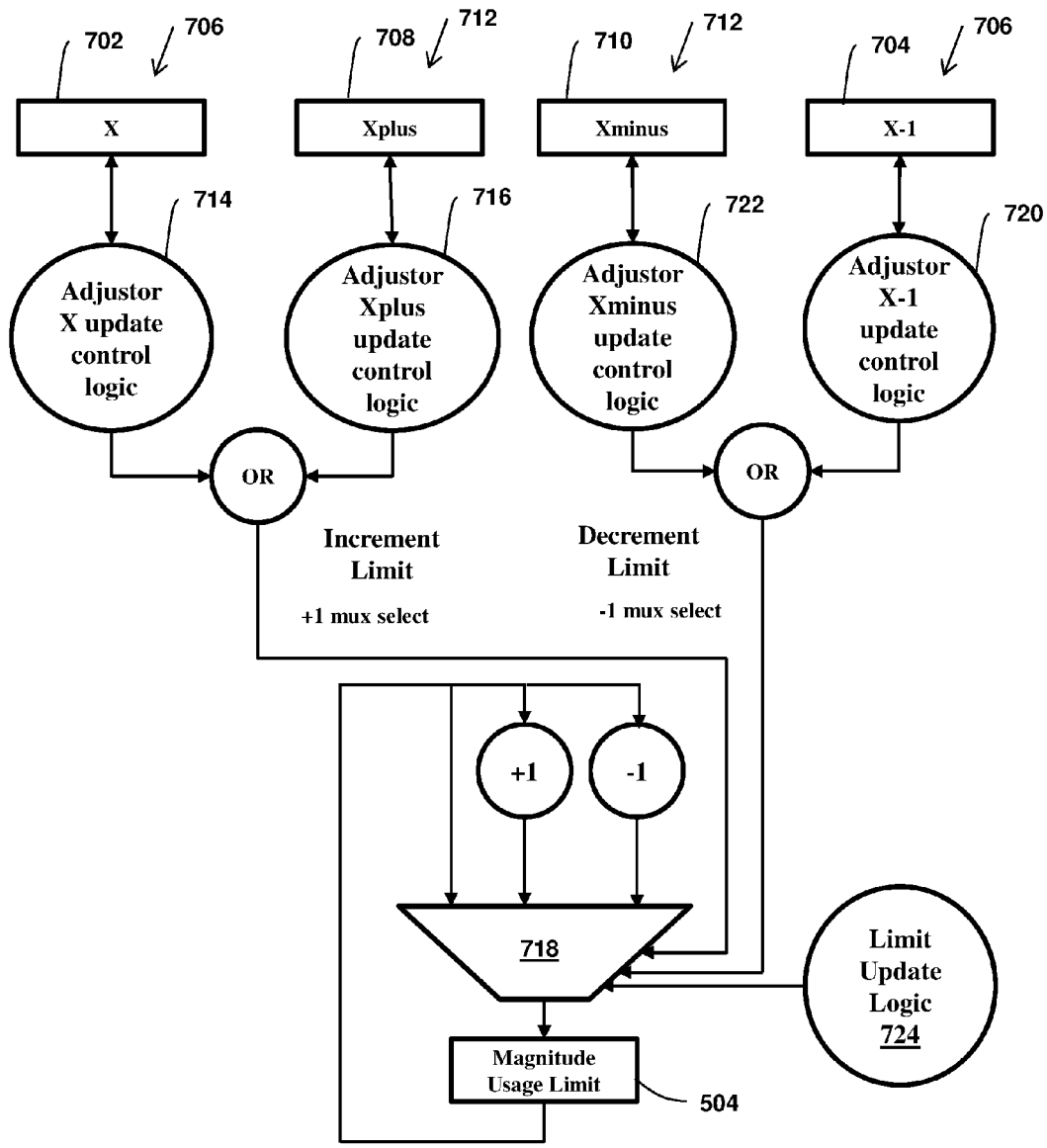
FIG. 7 depicts a block diagram for updating a limit using multiple adjustors in accordance with an embodiment.

FIG. 7 depicts a block diagram for updating a limit using multiple adjustors in accordance with an embodiment. In the example of FIG. 7, adjustor X 702 and adjustor X−1 704 are referred to as main adjustors 706. Adjustor Xplus 708 and adjustor Xminus 710 are referred to as range adjustors 712. It will be understood that embodiments may implement any number and combination of main adjustors 706 and range adjustors 712. In the example of FIG. 7, adjustors are each n-bit latches initialized to their midpoint. For example, if n=5, adjustor values range from 0 to 31. The initialization value at the midpoint value can be 15. After determining the outcome of a branch which was found in the auxiliary perceptron branch predictor 204 with auxiliary usefulness level 314>=global usefulness threshold 510, applicable adjustors can be updated.

An adjustor is applicable depending on how the current value of the magnitude usage limit 506 compares to the perceptron magnitude 416 based on adjustor update criteria (which can differ for each adjustor). Main adjustors 706 are updated only when the perceptron magnitude 416 is a single value. For example, adjustor X 702 is updated only when the perceptron magnitude 416 equals the magnitude usage limit 506. Adjustor X−1 704 is updated only when the perceptron magnitude 416 equals one less than the magnitude usage limit 506. Range adjustors 712 are updated when the perceptron magnitude 416 is in a set consisting of a range of values. For example, the adjustor Xplus 708 is updated if the perceptron magnitude 416 is in the set of {L+1, . . . L+r} where r is the size of the range and L is the magnitude usage limit 506. If r=3, the adjustor Xplus 708 is updated if the perceptron magnitude 416 is in the set of {L+1, L+2, L+3}. Similarly the adjustor Xminus 710 is updated if the perceptron magnitude 416 is in the set of {L−2, . . . , L−r−1}. With r=3, the Xminus update criteria is the set of {L−2, L−3, L−4}. In these examples, the adjustors 702, 704, 708, 710 have non-overlapping ranges. Therefore, at most one adjustor will be updated. In alternate embodiments, adjustors can have overlapping update criteria, in which case multiple adjustors could be updated simultaneously.

Updates of adjustors 702, 704, 708, and 710 can be controlled by respective instances of update control logic. For example, adjustor X 702 is controlled by adjustor X update control logic 714, and adjustor Xplus 708 is controlled by adjustor Xplus update control logic 716. Either the adjuster X update control logic 714 or the adjustor Xplus update control logic 716 can drive multiplexer 718 to increment the magnitude usage limit 504. Adjustor X−1 704 is controlled by adjustor X−1 update control logic 720, and adjustor Xminus 710 is controlled by adjustor Xminus update control logic 722. Either the adjuster X−1 update control logic 720 or the adjustor Xminus update control logic 722 can drive multiplexer 718 to decrement the magnitude usage limit 504. Limit update logic 724 can command the multiplexer 718 to hold the value of magnitude usage limit 504 unchanged if no increment or decrement is commanded.

An adjustor can be incremented if a perceptron branch prediction result is detrimental. A detrimental result occurs when the perceptron prediction was wrong and the primary prediction was correct. An adjustor is decremented if the perceptron branch prediction result was beneficial. That occurs when the perceptron prediction was correct and the primary prediction was wrong. If the perceptron was neutral, the adjustor value is unmodified. If the adjustor was already at its maximum value and was attempted to be incremented, it remains at the maximum value and is detected as being a saturation case. Similarly, if an adjustor was already at its minimum value of 0 and was attempted to be decremented, it remains 0 and is detected as being a saturation case.

When an adjustor saturates positive, this means that for the range covered by the adjustor, the perceptron is considered detrimental more often than beneficial. If the range covered by the adjustor is >=L, then L (magnitude usage limit 504) is increased to prevent the perceptron from being used when it is detrimental. The adjustor update control logic indicates to increment the limit in this case, e.g., adjustor X update control logic 714 or adjustor Xplus update control logic 716.

Similarly, when an adjustor saturates at 0, this means that for the range covered by the adjustor, the perceptron is considered beneficial more often than detrimental. If the range covered by the adjustor is <L, then L (magnitude usage limit 504) should be decreased to allow the perceptron to be used when it would be beneficial. The adjustor update control logic indicates to decrement the limit in this case, e.g., adjustor X−1 update control logic 720 or adjustor Xminus update control logic 722.

Based on indications from all of the adjustors' update control logic, a final decision is made about how to modify the magnitude usage limit 504 by the limit update logic 724. In the case where only one adjustor is updated at a time, only one adjustor may indicate a desired action (increment or decrement). In that case, the magnitude usage limit 504 is incremented or decremented by one as appropriate. If no adjustor indicates a desired action, then the magnitude usage limit 504 remains unmodified. Upon changing the magnitude usage limit 504, all adjustors can be re-initialized to their midpoint values.

Figure 8:
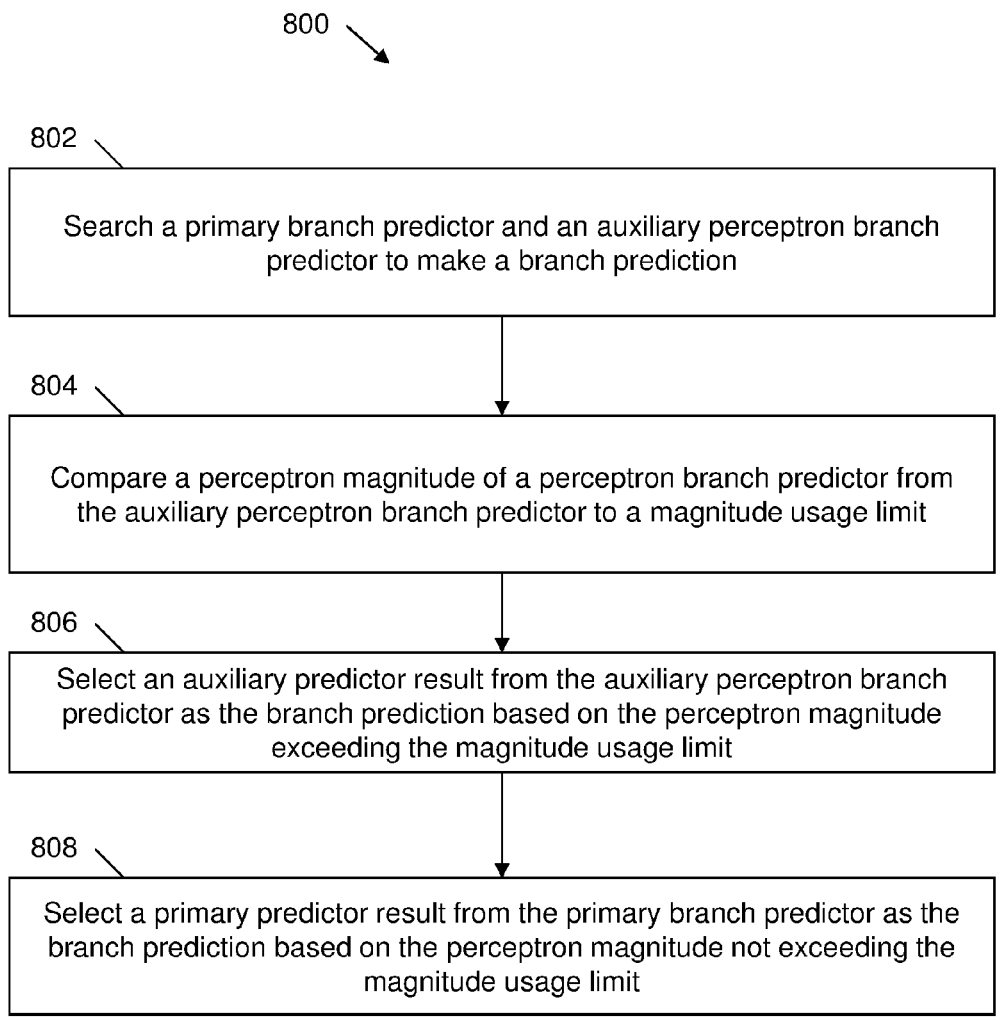
FIG. 8 is a process flow diagram for selecting a branch predictor using a magnitude usage limit of an auxiliary perceptron branch predictor in accordance with an embodiment.

FIG. 8 depicts a high-level process flow diagram for selecting a branch predictor using a magnitude usage limit of an auxiliary perceptron branch predictor in a processing system in accordance with an embodiment. Process 800 of FIG. 8 is a method that can be performed by the branch predictor 118 of FIGS. 1 and 2. For ease of explanation, process 800 is described in reference to the branch predictor 118 of the processing system 100 of FIGS. 1 and 2 and in further reference to FIGS. 3-7.

At block 802, the primary search and hit controller 214 searches the primary branch predictors 202 and generates a primary predictor result 216, which may include a branch target address and prediction direction (taken/not taken). The auxiliary search and hit controller 224 searches the auxiliary perceptron branch predictor 204 and generates an auxiliary predictor result 226, which may include a branch target address and prediction direction (taken/not taken).

As previously described, the auxiliary predictor state data 312 of the auxiliary perceptron branch predictor 204 includes perceptron weights 402 for the perceptron branch predictor 400. Modified weights 412 can be computed based on the perceptron weights 402 and values of the history vector 404. Summing of the modified weights 412 produces the perceptron magnitude 416 and a prediction direction 418.

At block 804, a comparison of a perceptron magnitude 416 of a perceptron branch predictor 400 from the auxiliary perceptron branch predictor 204 is performed with respect to a magnitude usage limit 506. The comparison can be performed by predictor selector logic 500 that may be within the auxiliary search and hit controller 224 or elsewhere in the branch predictor 118. A predictor selection 228 resulting from the comparison can be provided to the predictor selector 230.

The magnitude usage limit 506 can be dynamically adjusted by a plurality of main adjustors 706 and range adjustors 712 that track whether the perceptron magnitude 416 is greater than, less than, or equal to the magnitude usage limit 506. The auxiliary usefulness level 314 can be maintained for each of a plurality of entries 306 tracked in the auxiliary perceptron branch predictor 204, where the auxiliary usefulness level 314 indicates a history of mispredictions by the primary branch predictors 202. One or more of the main adjustors 706 and range adjustors 712 can be modified based on determining an outcome of a branch found in an entry 306 of the auxiliary perceptron branch predictor 204 and determining that the auxiliary usefulness level 314 of the entry 306 is at or above a global usefulness threshold 510.

At block 806, the predictor selector 230 selects the auxiliary predictor result 226 from the auxiliary perceptron branch predictor 204 as the branch prediction 232 based on the perceptron magnitude 416 exceeding the magnitude usage limit 506, e.g., as indicated by predictor selection 228.

At block 808, the predictor selector 230 selects the primary predictor result 216 from the primary branch predictors 202 as the branch prediction 232 based on the perceptron magnitude 416 not exceeding the magnitude usage limit 506, e.g., as indicated by predictor selection 228.

Figure 9:
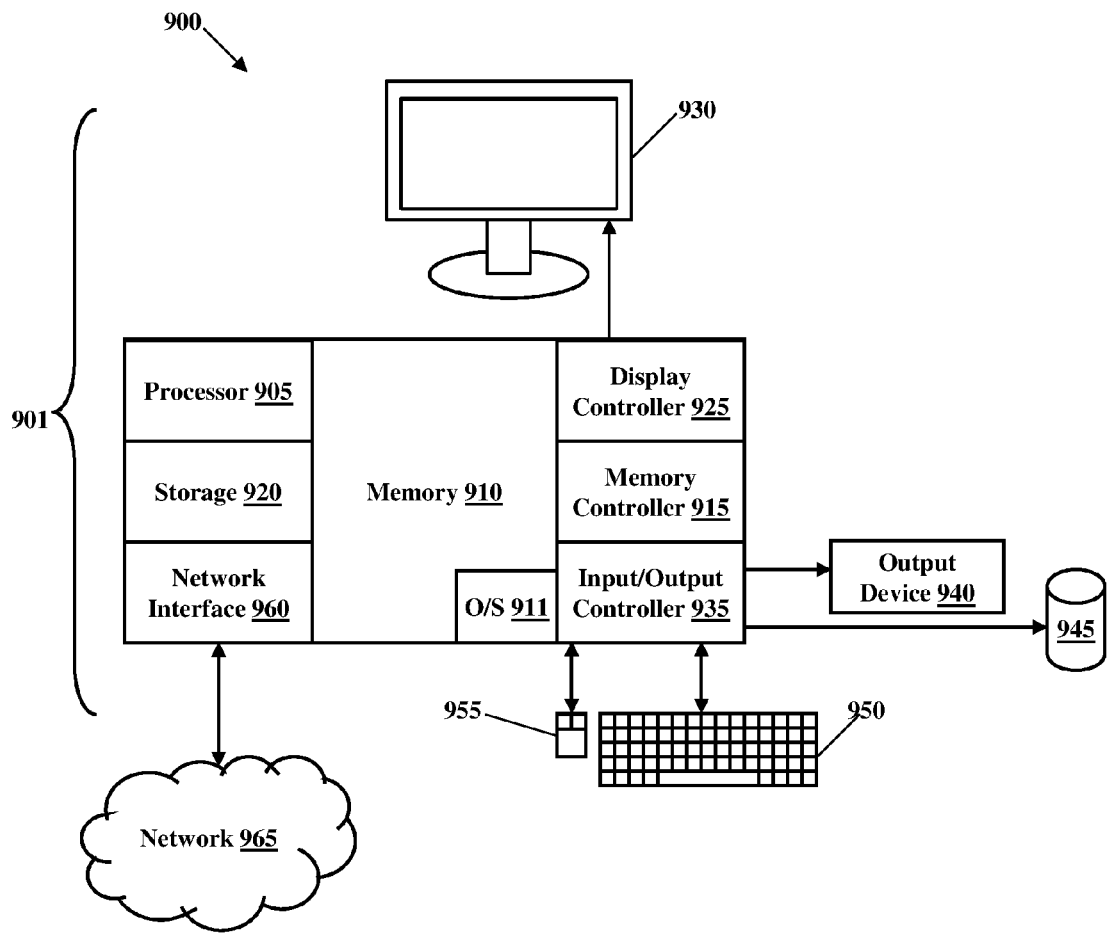
FIG. 9 is a computing system according to an embodiment.

FIG. 9 depicts a block diagram of a system 900 for auxiliary perceptron branch prediction with a magnitude usage limit in a processor 905. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 900 therefore includes computer 901 as illustrated in FIG. 9.

In an exemplary embodiment, in terms of hardware architecture, as shown in FIG. 9, the computer 901 includes a processor 905 which is a processing circuit that includes the processing pipeline 106 of FIG. 1 and branch predictor 118. The computer 901 further includes memory 910 coupled to a memory controller 915, and one or more input and/or output (I/O) devices 940, 945 (or peripherals) that are communicatively coupled via a local input/output controller 935. The input/output controller 935 can be, for example but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in storage 920, such as cache storage, or memory 910. The processor 905 can be any custom made or commercially available processor, a central processing unit (CPU), an auxiliary processor among several processors associated with the computer 901, a semiconductor based microprocessor (in the form of a microchip or chip set), a macroprocessor, or generally any device for executing instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, and/or other types of storage media. Note that the memory 910 can have a distributed architecture, where various components are situated remote from one another, but can be accessed by the processor 905.

The instructions in memory 910 may include one or more separate programs, each of which comprises an ordered listing of executable instructions for implementing logical functions. In the example of FIG. 9, the instructions in the memory 910 a suitable operating system (OS) 911. The operating system 911 essentially controls the execution of other computer programs and provides scheduling, input-output control, file and data management, memory management, and communication control and related services.

In an exemplary embodiment, a conventional keyboard 950 and mouse 955 can be coupled to the input/output controller 935. Other output devices such as the I/O devices 940, 945 may include input devices, for example but not limited to a printer, a scanner, microphone, and the like. Finally, the I/O devices 940, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 900 can further include a display controller 925 coupled to a display 930. In an exemplary embodiment, the system 900 can further include a network interface 960 for coupling to a network 965. The network 965 can be an IP-based network for communication between the computer 901 and any external server, client and the like via a broadband connection. The network 965 transmits and receives data between the computer 901 and external systems. In an exemplary embodiment, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 901 is a PC, workstation, intelligent device or the like, the instructions in the memory 910 may further include a basic input output system (BIOS) (omitted for simplicity). The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to fetch and execute instructions stored within the memory 910, to communicate data to and from the memory 910, and to generally control operations of the computer 901 pursuant to the instructions.

In an exemplary embodiment, where the branch predictor 118 of FIG. 2 is implemented in hardware, the methods described herein, such as process 800 of FIG. 8, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include achieving increased branch prediction accuracy in an efficient manner by allocating branch predictor entries in an auxiliary perceptron branch predictor for a small subset of branches that most benefit from the auxiliary perceptron branch predictor's increased accuracy predictions. A magnitude usage limit ensures that the auxiliary perceptron branch predictor is selected when prediction confidence is sufficiently high. Dynamic adjustments to the magnitude usage limit tunes selection between primary and auxiliary predictors to match the current workload performance and reduce the use of auxiliary predictor results when detrimental.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for branch prediction in a processing system comprising a primary branch predictor and an auxiliary perceptron branch predictor, the method comprising:
searching the primary branch predictor and the auxiliary perceptron branch predictor to make a branch prediction, wherein the auxiliary perceptron branch predictor is an artificial neural network that predicts branch direction by learning correlations between values in a history vector and branch outcomes;
computing a plurality of modified weights based on a plurality of perceptron weights and the values in the history vector, wherein the history vector tracks a sequence of branch direction predictions;
summing the modified weights to produce a perceptron magnitude;
comparing the perceptron magnitude of a perceptron branch predictor from the auxiliary perceptron branch predictor to a magnitude usage limit, wherein the magnitude usage limit is dynamically adjusted during a learning limit process that learns at what value the auxiliary perceptron branch predictor is more often correct and the primary branch predictor is more often incorrect;
selecting an auxiliary predictor result from the auxiliary perceptron branch predictor as the branch prediction based on the perceptron magnitude exceeding the magnitude usage limit; and
selecting a primary predictor result from the primary branch predictor as the branch prediction based on the perceptron magnitude not exceeding the magnitude usage limit.

2. The method of claim 1, wherein auxiliary predictor state data of the auxiliary perceptron branch predictor comprises the perceptron weights for the perceptron branch predictor.

3. The method of claim 2, wherein
summing the modified weights produces a prediction direction.

4. The method of claim 3, wherein the history vector is shared globally across a plurality of perceptron branch predictors to track the sequence of branch direction predictions.

5. The method of claim 1, wherein the magnitude usage limit is dynamically adjusted by a plurality of main adjustors and range adjustors that track whether the perceptron magnitude is greater than, less than, or equal to the magnitude usage limit.

6. The method of claim 5, further comprising:
maintaining an auxiliary usefulness level for each of a plurality of entries tracked in the auxiliary perceptron branch predictor, wherein the auxiliary usefulness level indicates a history of mispredictions by the primary branch predictor; and
modifying one or more of the main adjustors and range adjustors based on determining an outcome of a branch found in an entry of the auxiliary perceptron branch predictor and determining that the auxiliary usefulness level of the entry is at or above a global usefulness threshold.

7. A processing system comprising:
a primary branch predictor;
a primary search and hit controller operable to search the primary branch predictor and generate a primary predictor result;
an auxiliary perceptron branch predictor, wherein the auxiliary perceptron branch predictor is an artificial neural network that predicts branch direction by learning correlations between values in a history vector and branch outcomes, computes a plurality of modified weights based on a plurality of perceptron weights and the values in the history vector, and sums the modified weights to produce a perceptron magnitude, wherein the history vector tracks a sequence of branch direction predictions;
an auxiliary search and hit controller operable to search the auxiliary perceptron branch predictor and generate an auxiliary predictor result; and
a predictor selector operable to perform:
selecting the auxiliary predictor result as a branch prediction based on the perceptron magnitude from the auxiliary perceptron branch predictor exceeding a magnitude usage limit, wherein the magnitude usage limit is dynamically adjusted during a learning limit process that learns at what value the auxiliary perceptron branch predictor is more often correct and the primary branch predictor is more often incorrect; and
selecting the primary predictor result as the branch prediction based on the perceptron magnitude from the auxiliary perceptron branch predictor not exceeding the magnitude usage limit.

8. The processing system of claim 7, wherein auxiliary predictor state data of the auxiliary perceptron branch predictor comprises the perceptron weights for the perceptron branch predictor.

9. The processing system of claim 8, wherein the modified weights are summed to produce a prediction direction.

10. The processing system of claim 9, wherein the history vector is shared globally across a plurality of perceptron branch predictors to track the sequence of branch direction predictions.

11. The processing system of claim 7, wherein the magnitude usage limit is dynamically adjusted by a plurality of main adjustors and range adjustors that track whether the perceptron magnitude is greater than, less than, or equal to the magnitude usage limit.

12. The processing system of claim 11, wherein an auxiliary usefulness level is maintained for each of a plurality of entries tracked in the auxiliary perceptron branch predictor, the auxiliary usefulness level indicating a history of mispredictions by the primary branch predictor, and one or more of the main adjustors and range adjustors are modified based on determining an outcome of a branch found in an entry of the auxiliary perceptron branch predictor and determining that the auxiliary usefulness level of the entry is at or above a global usefulness threshold.

13. A computer program product comprising a computer readable storage medium having program instructions embodied therewith, the program instructions executable by a processor comprising a primary branch predictor and an auxiliary perceptron branch predictor to cause the processor to:

search the primary branch predictor and the auxiliary perceptron branch predictor to make a branch prediction, wherein the auxiliary perceptron branch predictor is an artificial neural network that predicts branch direction by learning correlations between values in a history vector and branch outcomes;

compute a plurality of modified weights based on a plurality of perceptron weights and the values in the history vector, wherein the history vector tracks a sequence of branch direction predictions;

sum the modified weights to produce a perceptron magnitude;

compare the perceptron magnitude of a perceptron branch predictor from the auxiliary perceptron branch predictor to a magnitude usage limit, wherein the magnitude usage limit is dynamically adjusted during a learning limit process that learns at what value the auxiliary perceptron branch predictor is more often correct and the primary branch predictor is more often incorrect;

select an auxiliary predictor result from the auxiliary perceptron branch predictor as the branch prediction based on the perceptron magnitude exceeding the magnitude usage limit; and select a primary predictor result from the primary branch predictor as the branch prediction based on the perceptron magnitude not exceeding the magnitude usage limit.

14. The computer program product of claim 13, wherein auxiliary predictor state data of the auxiliary perceptron branch predictor comprises the perceptron weights for the perceptron branch predictor.

15. The computer program product of claim 14, wherein the program instructions executable by the processor further cause the processor to:

sum the modified weights to produce a prediction direction.

16. The computer program product of claim 15, wherein the history vector is shared globally across a plurality of perceptron branch predictors to track the sequence of branch direction predictions.

17. The computer program product of claim 13, wherein the magnitude usage limit is dynamically adjusted by a plurality of main adjustors and range adjustors that track whether the perceptron magnitude is greater than, less than, or equal to the magnitude usage limit.

18. The computer program product of claim 17, wherein the program instructions executable by the processor further cause the processor to:

maintain an auxiliary usefulness level for each of a plurality of entries tracked in the auxiliary perceptron branch predictor, wherein the auxiliary usefulness level indicates a history of mispredictions by the primary branch predictor; and modify one or more of the main adjustors and range adjustors based on determining an outcome of a branch found in an entry of the auxiliary perceptron branch predictor and determining that the auxiliary usefulness level of the entry is at or above a global usefulness threshold.

* * * * *